Wayne E. Bechtelheimer
Robert A. Schneider
Lindsey J. Ball
JOINT INVENTORS.

BY
ATTORNEY

Patented Mar. 3, 1925.

1,528,598

UNITED STATES PATENT OFFICE.

WAYNE E. BECHTELHEIMER, ROBERT A. SCHNEIDER, AND LINDSEY J. BALL, OF OWENSMOUTH, CALIFORNIA.

PLOW.

Application filed January 8, 1923. Serial No. 611,373.

*To all whom it may concern:*

Be it known that we, WAYNE E. BECHTELHEIMER, a citizen of the United States, ROBERT A. SCHNEIDER, a native of Germany (having declared his intentions of becoming a citizen of the United States), and LINDSEY J. BALL, a native of England (having declared his intentions of becoming a citizen of the United States of America), residents of Owensmouth, in the county of Los Angeles, State of California, as joint inventors, have invented a new and useful Improvement in Plows, of which the following, when read with reference to the accompanying drawings, is such a full, clear, and exact specification embodying the invention in its preferred form as will enable others skilled in the art to which it appertains to make and use the same.

Our invention relates to an improvement in plows and has for one of its objects to provide a means whereby the plow may operate both as a right-hand and a left-hand plow by having a reversible moldboard attached thereto.

Another object is to provide a means of avoiding the necessity of going around the field in the plowing process and thus enable the implement to be drawn backward and forward across the field.

Another object is to provide a plow that can be used on a hillside since the dirt may be thrown in one way only, thus leaving no high ridges or dead furrows.

Another object is to provide a means of passing backwardly and forwardly across the field without the use of two separate plows or two separate beams.

Another object is to provide a reversible moldboard so arranged as to place the same in operative position with respect to opposed plowshares by the swinging operation of the said plowbeam, thus automatically reversing the moldboard in successive relation to either one of the said plowshares, thus providing also a means of selective adaptation of the said moldboard.

Another object is to provide a reversible plow having only one moldboard so swingingly mounted and automatically arranged as to serve two shares disposed in opposition in the frame thereof.

Other objects will be apparent from the reading of the specifications and claims and by reference to the drawings, all of which form an essential part of this specification.

Having thus described the objects of our invention though without limiting ourselves to the objects thus enumerated, we will now describe the same with reference to the said drawings.

Figure 1:
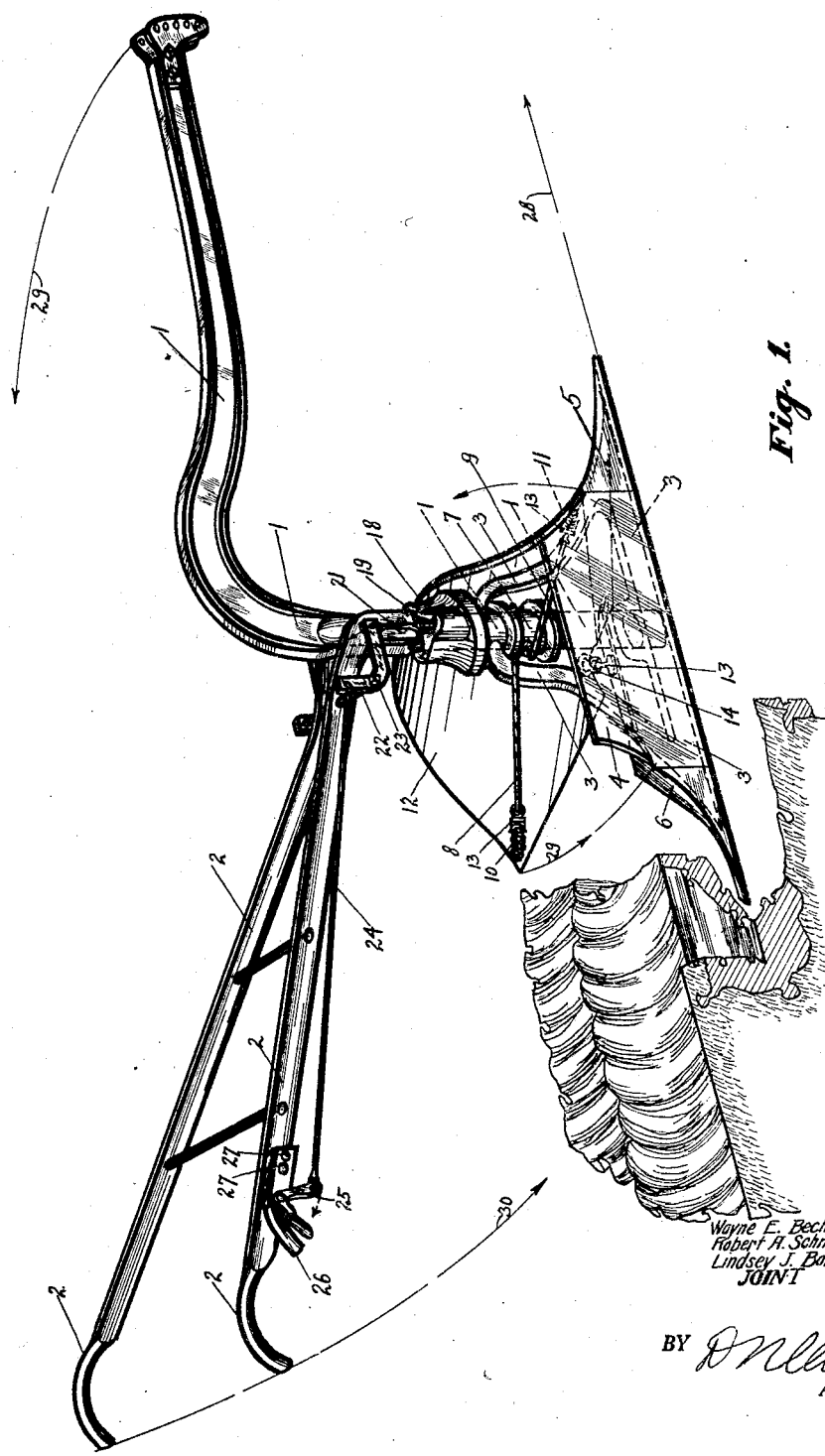
Figure 1 is a perspective view of the plow in operative relation.
Figure 2:
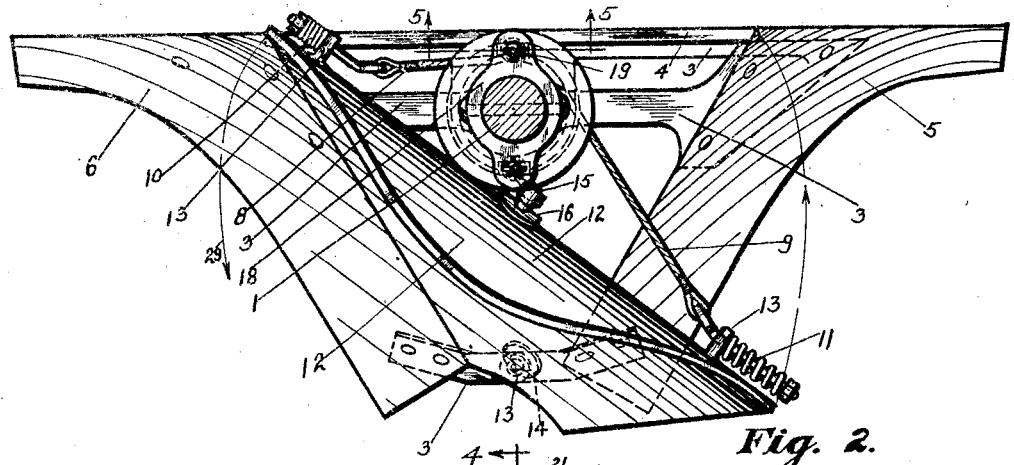
Figure 2 is a plan-view of the plow as seen from the top.
Figure 3:
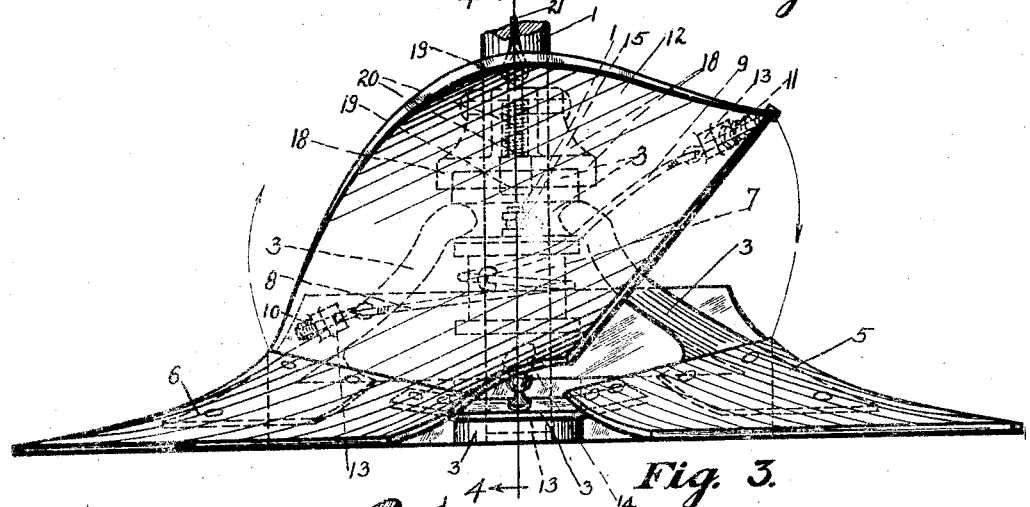
Figure 3 is a side-elevation of the plow.
Figure 4:
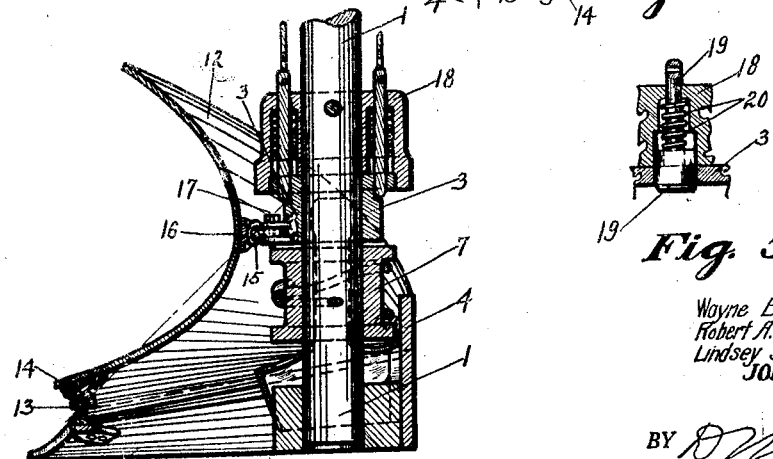
Figure 4 is a cross-sectional view of the plow taken on line 4—4 as shown in Figure 3 looking in the direction of the arrows.
Figure 5:
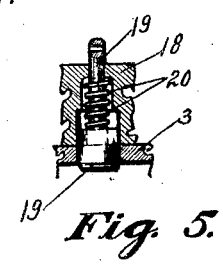
Figure 5 is a detailed view of the locking device as taken on line 5—5 as shown in Figure 2.

In carrying out our invention, a plow-beam 1, as shown in Figures 1, 2, 3, and 4, is provided. Attached to beam 1, are plow-handles 2, as shown in Figure 1. To the lower end of plow-beam 1, plow-frame 3 is journaled, as shown in Figures 1, 2, 3 and 4. Upon plow-beam 3, landside 4 and plow-shares 5 and 6, as shown in Figures 1, 2 and 3, and in cross-section in Figures 4, are arranged. There is rigidly attached to plow-beam 1, drum 7, as shown in Figures 1, 3 and 4. To drum 7 are attached cables 8 and 9, as shown in Figures 1, 2 and 3; the said cables being wound reversely to each other, as shown, and the outer ends being collocated with spiral springs 10 and 11 to reversible moldboard 12, as shown in Figures 1, 2 and 3; these cables being attached to said moldboard 12 by fasteners 13, as shown in Figures 1, 2 and 3. At the lower margin of reversible moldboard 12, ball-pivot 14 is arranged, the said ball-member 13 being securely fixed to plow-frame 3, as shown in Figure 4, and in operative arrangement with socket 14, as shown in Figures 1, 2 and 3, and in cross-section in Figure 4. At the central part of moldboard 12 correspond ball and socket members are arranged; the ball being designated as 15 and the socket attached to reversible moldboard 12 is designated as 16, as shown in Figure 2. The said ball is held upon pivoting arm by means of bolt 17, in frame 3, as shown in cross-section in Figure 4, as can be readily understood.

Securely attached to beam 1 is flange 18, as shown in all figures. In this flange 18, two releasing pins 19 are arranged with spiral springs 20, so collocated therewith as to exert a downward pressure upon member 19. To member 19, extension-arm 21 is arranged connected to pivoting arm 22, held upon handle 2, by means of bolt 23, as shown in Figure 1. To the upper part of arm 22, rod 24 is attached connecting with handhold 25, as shown in Figure 1, all of which is arranged with hand-brace 26, attached to handle 2, by means of rivets 27.

Now, it will be understood that in operative relation when the said plow is pulled in the direction indicated by arrow 28, as shown in Figure 1, moldboard 12 will be in operative relation with plowshare 5, as shown in Figure 1. Now, when plow-beam 1 is swung in the direction indicated by arrow 29 and the handles are swung in the direction indicated by arrow 30, drum 7 will unwind cable 8 and wind up cable 9, so that when the beam is reversely arranged with respect to frame 3, the said moldboard 12 will be operatively arranged with plowshare 6, as shown in Figures 2, 3 and 4. As cable 8 is wound tightly by means of drum 7, as indicated, increased tension will be brought upon spring 10, thus closing it, as shown in Figures 1 and 3, while the tension will be released upon cable 9 and upon spring 11, as shown in Figures 2 and 3. The increasing tension upon cable 8 will tend to rock the arm 15 on pivot 17, as shown in Figure 4, thus requiring and permitting the reversible moldboard to be held in operative relation with share 6, as shown in Figures 2, 3 and 4.

It will, of course, be understood that in order to release the plow-beam so that the same may swing with respect to frame 3, it will be necessary for the operator to release the fastener 19 with respect to flange 18 by means of handle 25 operating through rod 24, through pivoting arm 22 and extension-rod 21, as shown in Figure 1.

Of course, it will be further understood that various changes can be made in the arrangement, collocation and association of parts without departing from the spirit of this invention.

It will also be understood that gang-plows may be arranged using the same reversible moldboard by details of adaptation without departing from the spirit of this invention.

Having thus described our invention in its preferred form though without limiting ourselves to the exact arrangement, association and collocation of parts, as shown and described, what we claim and for which we desire to secure Letters Patent are as follows:—

1. In a reversible plow, the combination of; a frame; a beam journaled within the said frame; two shares mounted upon the said frame, the said shares being oppositely disposed; a landside mounted upon the said frame; a moldboard pivotingly mounted upon the said frame; a drum mounted upon the said beam; cables oppositely disposed upon the said drum, the ends of the said cables being attached to the said moldboard, by a member yieldingly arranged by a spring; and a manually controlled fastener forming means of positioning the beam and frame in operative positions, substantially as shown.

2. In a reversible plow, the combination of; a frame; a beam swingingly mounted in the said frame; a landside; two shares oppositely disposed upon the said frame; a pivoting moldboard attached to the said frame; a drum mounted upon the said beam; cables oppositely disposed around the said drum, the ends of the said cables oppositely attached upon the said moldboard, the said beam, drum and cables forming automatic means of swinging the said moldboard into operative rotation with either share by the swinging movement of the said beam within the said frame, substantially as described; and a fastener, manually operated, for positioning the said beam and the said frame together, substantially as disclosed.

Subscribed and sworn to before us this 30th day of December, 1922.

WAYNE E. BECHTELHEIMER.
ROBERT A. SCHNEIDER.
LINDSEY J. BALL.